US008804932B2

(12) United States Patent
van Oortmarssen et al.

(10) Patent No.: US 8,804,932 B2
(45) Date of Patent: Aug. 12, 2014

(54) PROTECTION OF SERVICES IN MOBILE NETWORK AGAINST CLI SPOOFING

(75) Inventors: Hans Frederik van Oortmarssen, The Hague (NL); Alexander Franciscus Rambelje, Teteringen (NL)

(73) Assignee: Koninklijke KPN N.V., The Hague (NL)

( * ) Notice: Subject to any disclaimer, the term of this patent is extended or adjusted under 35 U.S.C. 154(b) by 836 days.

(21) Appl. No.: 12/582,485

(22) Filed: Oct. 20, 2009

(65) Prior Publication Data

US 2011/0091026 A1 Apr. 21, 2011

(30) Foreign Application Priority Data

Oct. 20, 2008 (EP) .................................... 08018300

(51) Int. Cl.
*H04M 1/56* (2006.01)

(52) U.S. Cl.
USPC ................... 379/142.05; 379/142.06; 455/410

(58) Field of Classification Search
USPC ............................... 455/410–411; 379/142.05
See application file for complete search history.

(56) References Cited

U.S. PATENT DOCUMENTS

| 6,298,234 | B1 * | 10/2001 | Brunner ...................... 455/432.1 |
| 6,411,807 | B1 * | 6/2002 | Amin et al. ................. 455/432.3 |
| 6,804,505 | B1 | 10/2004 | Nilsson et al. |
| 7,342,926 | B2 | 3/2008 | Uskela et al. |
| 2002/0098829 | A1 | 7/2002 | Tendler |
| 2007/0081648 | A1 | 4/2007 | Abramson et al. |
| 2007/0197203 | A1 * | 8/2007 | Hu ................................. 455/419 |
| 2008/0072062 | A1 * | 3/2008 | Pearson et al. ................ 713/185 |
| 2008/0089501 | A1 | 4/2008 | Benco et al. |

(Continued)

FOREIGN PATENT DOCUMENTS

| EP | 1106025 B1 | 2/2002 |
| EP | 1770973 A1 | 4/2007 |

(Continued)

OTHER PUBLICATIONS

Bob Sullivan, "Cell Phone Voicemail Easily Hacked", MSNBC.com, Retrieved from the Internet: URL:http://www.msnbc.msn.com/id/7046776/print/1/displaymode/1098/, XP002535029, Feb. 28, 2005, pp. 1-2.

(Continued)

*Primary Examiner* — Duc Nguyen
*Assistant Examiner* — Assad Mohammed
(74) *Attorney, Agent, or Firm* — McDonnell Boehnen Hulbert & Berghoff LLP

(57) ABSTRACT

An anti-CLI spoofing procedure controls access of a mobile communication device to a service on a communication network via a connection from outside the network. The device issues a unique identifier for identifying the device to the service. If the identifier is received from outside the network and over a secure signaling channel, a first time stamp is stored in a memory, representative of a first time of receipt of the identifier. The connection is set up and then a second time stamp is generated representative of a second time at which the connection is established to a node on the network. A first instruction is issued to establish unconditional access to the service if a time difference between the time stamps falls within a predetermined time window. A second instruction is issued to grant conditional access to the service if the time difference falls outside the predetermined window.

16 Claims, 3 Drawing Sheets

(56) References Cited

U.S. PATENT DOCUMENTS

| | | |
|---|---|---|
| 2008/0101568 A1 | 5/2008 | Ropolyi et al. |
| 2008/0123555 A1 | 5/2008 | Qi et al. |
| 2008/0155021 A1 | 6/2008 | Rainere et al. |
| 2008/0159501 A1 | 7/2008 | Cai |

FOREIGN PATENT DOCUMENTS

| | | |
|---|---|---|
| EP | 1933572 A2 | 6/2008 |
| WO | 03036994 A1 | 5/2003 |
| WO | 03055249 A1 | 7/2003 |
| WO | 2006133720 A1 | 12/2006 |
| WO | 2007002524 A1 | 1/2007 |
| WO | 2007064686 A2 | 6/2007 |
| WO | 2007126995 A2 | 11/2007 |
| WO | 2008017951 A2 | 2/2008 |
| WO | 2008082489 A1 | 7/2008 |

OTHER PUBLICATIONS

European Search Report from EP08018300.7, dated Jul. 28, 2009.

* cited by examiner

PROTECTION OF SERVICES IN MOBILE NETWORK AGAINST CLI SPOOFING

CROSS-REFERENCE TO RELATED APPLICATIONS

The present application claims priority to European Patent Application EP 08018300.7 filed in the EP Patent Office on Oct. 20, 2008, the entire contents of which are incorporated herein by reference.

FIELD OF THE INVENTION

The invention relates to controlling access of a mobile communication device to a service on a communication network via a connection from outside the communication network. The invention also relates to a data processing apparatus and to control software for controlling the access.

BACKGROUND

The caller identification (Caller ID) function in a telecommunications network is a service that provides information to the called party or to the called service about an identity of the calling party. The Caller ID function is also referred to as "Calling Line Identification" (CLI) or "Calling Party Id". CLI enables the called party or called service to identify and authorize the calling party. Caller ID is a simple string of data that can easily be generated by a small software program. Telemarketers and others have been using a feature to interfere with the CLI function so as to change their identity or hide their identity from the called party. "Caller ID" spoofing and "CLI spoofing" are expressions given to this practice of causing the telecommunications network to provide to the called party identity information that is different from the identity information from the actual originating party. CLI spoofing is not only abused to trick a called party into answering the telephone, but also to access someone else's voice mail in a voice mail system that uses CLI for identification.

CLI spoofing is not a risk if the initiating call originates within the operator's network, as the integrity of the CLI is guaranteed. There is a risk, however, if the initiating call is generated in another network than the home network of the operator, as the CLI can have been manipulated. For example, the CLI can be manipulated in external voice-over-IP (VoIP) networks. As a consequence, there is a risk that any call entering the home network has a CLI that has been manipulated.

Mobile telephone networks have been adopting an infrastructure, referred to as "CAMEL", for controlling calls. The acronym "CAMEL" stands for Customized Applications for Mobile networks Enhanced Logic, which is an ETSI/3GPP standard. CAMEL refers to a set of standards designed to work on a GSM or UMTS network. The standards allow an operator to define services on top of the conventional GSM or UMTS services. The CAMEL architecture itself is based on Intelligent Network (IN) standards. The IN architecture is intended for fixed telecommunications networks, as well as mobile telecommunications networks. The IN standards use the Signaling System #7 (SS7) protocol between telephone network switching centers and other network nodes owned by network operators. SS7 is a high-speed and high-performance packet-based communications protocol for controlling the call. In SS7, the signaling is out-of band and is carried in a separate signaling channel to which the end user has no access. The signaling path of SS7 is logically separated and distinct from the channels that carry the voice conversation. The control over the call, as provided by the network switches, is separated from the control over the service. Service control is assigned to computer nodes in the network. Accordingly, a CAMEL-based network provides a high level of security and CLI spoofing within a CAMEL-based network is considered a very low risk, if any at all. Furthermore, CAMEL allows mobile telephone network operators to offer the same IN services to their subscribers while they are roaming other CAMEL-based networks as they receive in their home CAMEL-based network, i.e., the network of the operator to whom they have subscribed.

A commonly applied defense mechanism to counter CLI spoofing when used to access voice mail from outside the operator's network is to request the accessing party to enter a secret password shared between the owner of the voice mail account and the voice mail system. The password is, e.g., a numeric password such as a personal identification number (PIN), or a combination of the PIN and the telephone number of the communications device associated with the account. Similarly, the password can be used for protection of other network services that are based on CLI such as customer service of the network operator, a help-desk service, a self-care voice portal, etc.

Another approach is disclosed in WO2008082489 that relates to Caller ID validation methods and system to protect against Caller ID spoofing. When a call is placed over a communication network, a validation system receives the call signaling, and processes the call signaling to identify originating node information in the call signaling. The originating node information is inserted by the communication network when handling the call and pertains to a network node that originates the call into the network. The validation system also processes the call signaling to identify caller ID information for the call. The validation system then processes the originating node information and the caller ID information to determine whether the call originated from the originating node. If the call did originate from the originating node, then the validation system determines that the caller ID information is valid.

For background information about spoofing, please see, e.g., US 20080089501; US 20070081648; US 20020098829; and U.S. Pat. No. 7,342,926.

For background information on IN please see, e.g., US 20080155021.

For background information on CAMEL networks, please see, e.g., WO2008/17951; WO2007/126995; and WO2003036994.

For background information on transit networks, please see, e.g., US 20080101568; and WO 2003/036994.

For background information on aspects of roaming, please see, e.g., WO 2006133720; WO2007002524; WO2003055249; EP1106025; EP1933572; and U.S. Pat. No. 6,804,505.

SUMMARY

As mentioned above, CLI spoofing is not considered a risk for communications between parties within the home network of an individual network operator, e.g., a communication wherein the end-user accesses his/her voice mail from within the network, or a communication wherein the user accesses, from within the home network, other network services that involve the CLI. Examples of the latter are a customer service, and a self-care voice portal (a voice-equivalent of a Web portal through which customers can interact with automated services via voice commands or via keyboard commands using Dual-Tone Multi-Frequency signaling over the telephone line in the voice-frequency band. On the other hand, CLI spoofing is considered a risk for incoming calls into the home network, e.g., calls originating in VoIP networks. The originating network usually routes its calls via one or more transit networks. As a result, the originating network cannot be determined anymore at the entry point of the home network, and any incoming call could therefore have originated at an untrusted VoIP network.

The inventors have realized that the input of passwords for access of voice mail or other CLI-based services is rather cumbersome as perceived by the end-user. The end-user has to remember his/her password, and the entering thereof costs extra time that in turn increases the costs of the network connection. In many cases, the user may have forgotten his/her password so that the call will not succeed, leading to a loss of revenue to the operator.

Furthermore, the known system disclosed in WO2008082489, mentioned above, requires that the network nodes involved be configured for creating and communicating the relevant call signaling parameters via the network.

The inventors therefore propose to facilitate accessing of CLI-based network services of the home network from another CAMEL-based network without jeopardizing security against CLI-spoofing. The inventors also propose to accomplish this with minimum modification to the network components involved.

A proposal by the inventors relates to a method of controlling access of a mobile communication device to a service on a home network via a connection from outside the communication network. The device is, e.g., a mobile telephone. The home network comprises, e.g., a mobile network. The service includes, e.g., a voice mail service; a help desk service; a self care voice portal, etc. The device is configured for issuing a unique identifier for identifying the device to the service. The method comprises following steps. If the identifier is received from outside the home network and over a secure signaling channel, a first time stamp is stored in a memory. The first time stamp is representative of a first time of receipt of the identifier. A second time stamp is generated when a part of the connection has been set up to a node on the home network. The node comprises, e.g., a switch or a server supplying the service. Then, if a time difference between the second time and first time falls within a predetermined time window, the identifier is authorized and a first instruction is issued to the node, to establish an unconditional access of the device to the service. For example, in the call set-up from the node to the service, an indicator is used to inform the service that the identifier is valid and that therefore unconditional access can be granted. If the time difference falls outside the predetermined time window, the identifier is not authorized and a second instruction is issued to the node to establish a conditional access of the device to the service. For example, in the call set-up from the node to the service, an indicator is used to inform the service that the identifier could not be authorized and that the service has therefore to act accordingly, e.g., by asking for a password or the PIN-code or by denying access immediately.

Accordingly, a user of a legitimate device registered with the service is given unconditional access upon initiating the connection from another network providing a secure data channel, e.g., another CAMEL-based network. The user's authorization is not questioned as a result of having received the identifier via the secure signaling channel. Data on the secure channel cannot be manipulated by an imposter. If the user of the legitimate device connects to the communication network from another communication network without a secure channel, there will never be generated a first time stamp. As a result, the time difference falls outside the window and the access given is conditional, e.g., dependent on a password. If an imposter connects to the home communication network from another communication network not providing the secure signaling channel, access to the service is denied if the imposter cannot provide the password.

The invention, discussed so far, is implemented as a method. The invention can also be embodied as a data processing apparatus or data processing system that has a Service Control Point (SCP) functionality, and also as a software application. An SCP is a known component in an Intelligent Networks (IN) telephone system. An SCP is used to control the service and typically employ the SS7 technology. Such an apparatus or system is typically a data processing machine, manufactured by, e.g., Sun Microsystems, Hewlett-Packard or IBM, running a Unix, Oracle, or Windows operating system. SCPs are typically equipped with an SS7 interface card for receiving signaling messages. A supplier of SS7 interface cards is, e.g., Ulticom Inc. A more recent development of an SCP is a machine with an interface to an IP (Internet Protocol)-network, using a SIGTRAN protocol for SS7 communication via IP. SIGTRAN is the name of an Internet Engineering Task Force working group that issues specifications for certain communication protocols. As a result, the anti-CLI spoofing functionality of the invention can be an IN software application installed on such a machine.

More specifically, the invention also relates to a data processing system with Service Control Point functionality and configured for controlling access of a mobile communication device to a service on a communication network via a connection from outside the communication network. The device is configured for issuing a unique identifier for identifying the device to the service. The system comprises a memory and is configured for carrying out following steps. If the identifier is received from outside the communication network and over a secure signaling channel, a first time stamp is stored in the memory, the first time stamp being representative of a first time of receipt of the identifier. The connection is set up and a second time stamp is generated representative of a second time at which the connection is established to a node on the communication network. A first instruction is issued to the node to establish unconditional access of the device to the service if a time difference between the second time and first time falls within a predetermined time window. A second instruction is issued to the node to grant conditional access of the device to the service if the time difference falls outside the predetermined time window.

The invention further relates to control software, e.g., supplied on a data carrier or provided as a download via a data network, for installing on a Service Control Point in a communication network for controlling access of a mobile communication device to a service on a communication network via a connection from outside the communication network. The device is configured for issuing a unique identifier for identifying the device to the service. The software comprises the following pieces of code. First computer-readable control code is operative to store in a memory a first time stamp, representative of a first time of receipt of the identifier, if the identifier is received from outside the communication network and over a secure signaling channel. Second computer-readable control code is operative to set up the connection and to generate a second time stamp representative of a second time at which the connection is established to a node on the communication network. Third computer-readable control code is operative to issue a first instruction to the node to establish unconditional access of the device to the service if a time difference between the second time and first time falls within a predetermined time window. Fourth computer-readable control code is operative to issue a second instruction to the node to grant conditional access of the device to the service if the time difference falls outside the predetermined time window.

BRIEF DESCRIPTION OF THE DRAWING

Throughout the Figures, similar or corresponding features are indicated by same reference numerals.

DETAILED DESCRIPTION

Figure 1:
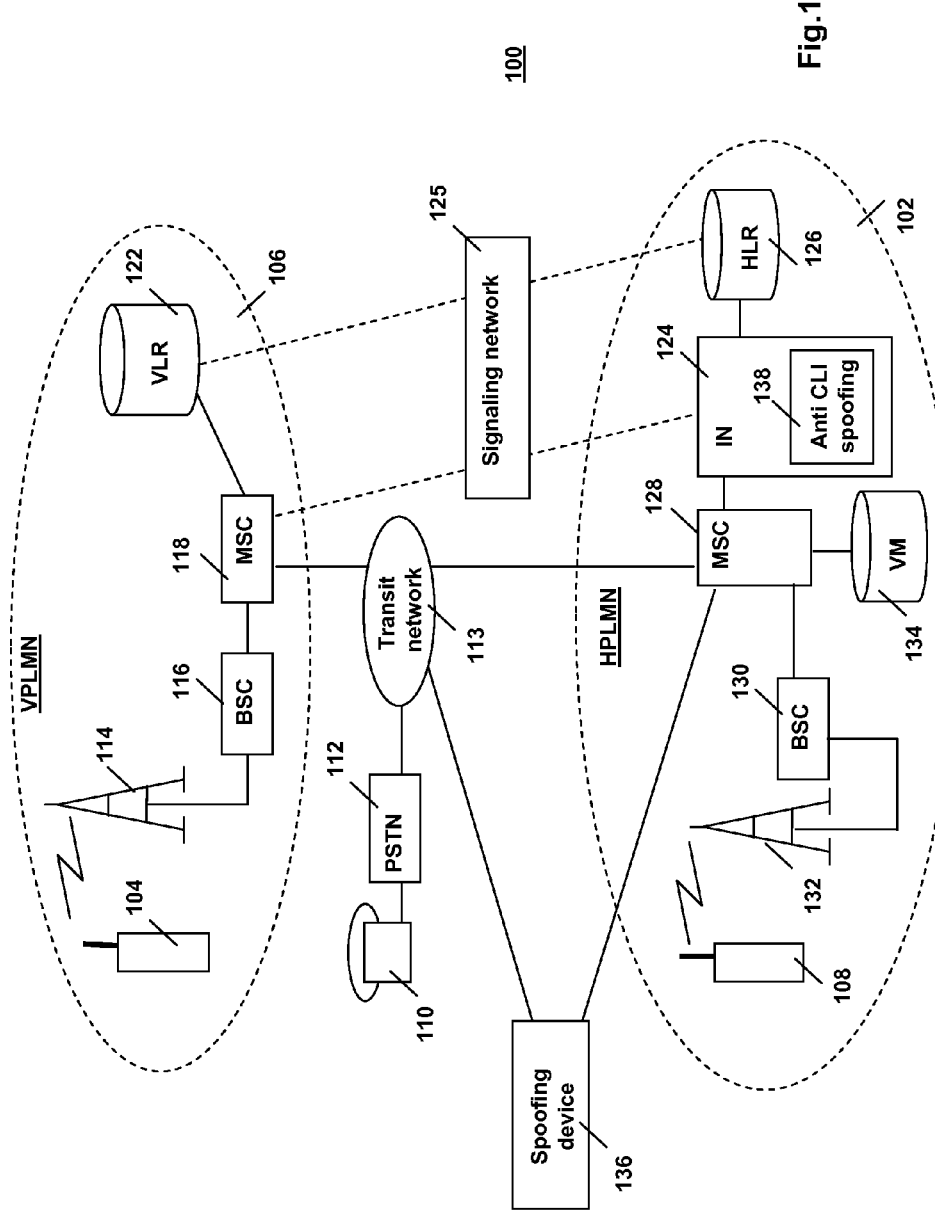
FIG. 1 is a block diagram of a system illustrating communication between a home communications network and a CAMEL-based network.

FIG. 1 is a block diagram of a system 100 explaining operation of a mobile telephone communication between a home network 102 and a CAMEL-based roaming network (106). Home network 102 is a first telecommunications network 102 of a first network operator, to whose services a user of mobile telecommunications device 104, e.g., a mobile phone, has subscribed. Network 102 has a first geographical coverage. The geographical region covered by network 102 is also called the service area of network 102. The operator of network 102 has established CAMEL-agreements with some, but not necessarily all, operators of roaming networks. CAMEL-based roaming network 106 is a second telecommunications network 106 of a second operator. The geographical region covered by network 106 is called the service area of network 106. The operator of network 102 has established a CAMEL-agreement with the operator of network 106.

If the user of device 104 has left the service area of network 102 and roams on network 106, he/she can still be using device 104 for communicating with other people residing in network 102 (or in other networks, not shown), e.g., with the user of a mobile telecommunications device 108 or with a user of a landline telephone 110 via public switched telephone network (PSTN) 112 and transit network 113. This is due to the roaming agreements between the network operators and to the supporting infrastructure of networks 102 and 106 as will be explained below.

Assume that the user of device 104 turns on device 104 for the first time while being in the service area of network 106 or is entering the service area of network 106 while device 104 is roaming on another network. Visited network 106 then detects the presence of device 104 and will then start an authentication procedure. If turned-on, device 104 transmits its identifier (here: its IMSI (International Mobile Subscriber Identity)) number. This authentication identifier is received by a base station 114, and forwarded via a base station controller (BSC) 116 to a mobile switching center (MSC) 118 of network 106. This IMSI number is unique to device 104. For a mobile phone, it is typically stored in the phone's SIM (subscriber identity module). Network 106 maintains a database 122 (referred to as "Visitor Location Register" (VLR), based on IMSI numbers of all mobile telecommunications devices currently active within the service area of network 106. VLR 122 stores records of information about the active mobile telecommunications devices, e.g., their IMSI number and MSISDN (Mobile Subscriber Integrated Services Digital Network) number; the kind of services that each of these devices is authorized to use. As known, the IMSI number and MSISDN number are two important numbers to identify a mobile telephone. The IMSI number is typically used as a key in the subscriber database (see "HLR 126" introduced below). The MSISDN number is typically used as the identifier towards a voicemail system. The MSISDN number is usually also the number that is dialed in order to make a call to that mobile telephone.

In order to obtain this information, VLR 122 identifies the relevant home network of a detected device on the basis of the IMSI number received by network 106. The home network of device 104 is network 102. VLR 122 uses the IMSI number received from device 104 to access a database 126 (referred to as Home Location Register, or: HLR) of home network 102 and requests information about the privileges of device 104. HLR 126 maintains records specifying this kind of information for each individual subscriber to the services of home network 102. In order to authorize device 104 on the basis of the IMSI number, HLR 126 and the Subscriber Identity Module (SIM) (not shown) in device 104 start a procedure referred to as "GSM authentication procedure". In this procedure, cryptographic information is exchanged between the SIM of device 104 and HLR 126. Since network 102 and network 106 have concluded a CAMEL Roaming Agreement, HLR 126 returns, upon completion of the authentication procedure, to VLR 122 the information needed for VLR 122 to determine whether or not device 104 is authorized to roam network 106 and the kind of services it is allowed to use, and for what services the home network needs to be contacted prior to execution of the services. For example, HLR 126 returns information to VLR 122 about how to proceed in case device 102 attempts to set-up a call. HLR 126 provides trigger data to VLR 122 for instructing MSC 118 to contact Intelligent Network (IN) 124 of home network 102 in case device 104 attempts to set-up a call, and for instructing MSC 118 to await further instructions from IN 124. Communication between MSC 118 in network 106 and IN 124 in network 102 uses a secure signaling channel, as does the communication between VLR 122 in network 106 and HLR in network 102. For example, the communication between MSC 118 and IN 124, and the communication between VLR 122 and HLR 126 uses a closed signaling network 125.

Consider the scenario wherein the user of device 104, while roaming in network 106 (the visited network), wants to make a call to the user of device 108 on network 102 (the home network) or to the user of landline telephone 110.

When device 104 dials a telephone number for placing a telephone call from its current location, i.e., within network 106, MSC 118 uses the trigger data received from VLR 122 and consults IN 124 in network 102 prior to setting up the call to the dialed destination. IN 124 analyses the information received from MSC 118 and in this case could determine that no special action is required. IN 124 will then instruct MSC 118 to set-up the call to the intended destination based on the number originally dialed by the user of device 104.

If fixed landline telephone 110 is the intended destination, MSC 118 sets up the call to telephone 110 via a transit network 113 and via PSTN 112. If device 108 is the intended destination, MSC 118 sets up the call to device 108 via transit network 113 and via an MSC 128 of network 102. The call is then routed from MSC 128 to a BSC 130 of network 102 and a base station 132 of network 102.

Now consider a scenario, wherein device 104, registered with network 102, is used to access, from network 106, a CLI-based service in network 102, e.g., the voice mail addressed to device 104. The voice mails are stored at a voice mail server 134 in network 102. The user of device 104 enters the network address of his voice mail, either a complete telephone number or only the short code. For example, the short code to access one's voice mail on the network of KPN in the Netherlands is "1233", whereas the complete telephone number to be dialed is "+31 (0)6 1200 1233".

As device 104 is located within the service area of network 106, the call is set up via MSC 118. As specified above, upon receiving the request to set up a call from device 104, MSC 118 asks IN 124 for instructions about how to handle the call. IN 124 instructs MSC 118 to set up the call with voice mail system 134 using the proper network address of server 134. The proper network address is in this example "+31-6-1200-1233". If the user has dialed the short code number instead, e.g., "1233" in the example above, IN 124 instructs MSC 118 to connect the call to "+31-6-1200-1233". The call will be set-up from MSC 118 via transit network 113 and MSC 128 to server 134.

Figure 2:
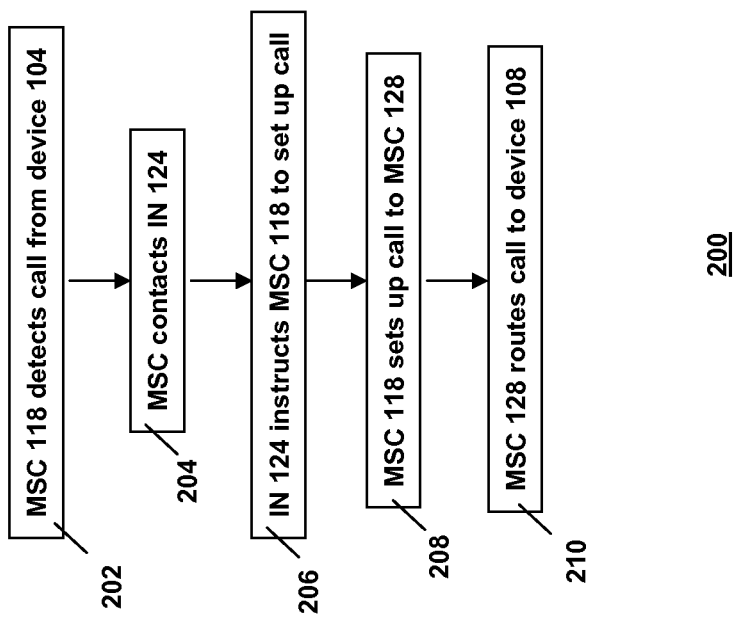
FIG. 2 is a flow diagram illustrating the communication steps in the system of FIG. 1.

FIG. 2 is a flow diagram 200 summarizing the steps in the scenario discussed above with reference to FIG. 1. It is assumed that the presence of device 104 has been detected and that VLR 122 has received the trigger data from HLR 126 in order to be capable to instruct MSC 118 to contact IN 124 of home network 102 upon device 104 initiating a call. In a step 202, MSC 118 detects that device 104 is initiating a call to a specific destination. In a step 204, MSC 118 contacts IN 124 to ask instructions about how to handle the call. IN 124 checks the records and returns, in a step 206, specific instructions as to how to handle the call, if any. In a step 208, MSC 118 sets up the call via transit network 113 and MSC 128. In a step 210, MSC 128 routes the call to device 108.

Assume now a communication device 136 that is posing as device 104 using CLI spoofing in order to access the voice mails addressed to the user of device 104. Device 136 is manipulated to initiate a call wherein the string of data is identical to the CLI associated with device 104 so as to mislead network 102. Device 136 is, e.g., a personal computer (PC) using voice-over-IP (VoIP) protocol. Without further measures, device 136 masquerading as device 104 will now be given access to the voice mail at server 134, on the basis of the CLI adopted by device 136. The operator of network 102 could build-in an additional barrier, by giving conditional access to the voice mail upon receiving the correct password (e.g., PIN) as registered for the user of device 104. As mentioned above, this is a solution that has a drawback as it would hamper the legitimate user each time he/she accesses his/her voice mail. The service would then be perceived as not so user-friendly and, as a result, network traffic, generated from voice mail accesses from another network, would significantly drop as would the revenues for the network operator derived from accesses from outside network 102.

The inventor proposes, among other things, to avoid that the user of device 104 has to enter a password when calling from another CAMEL-based network to a CLI-based service on his/her home network that is CAMEL-based as well, and at the same time to provide security against CLI spoofing. This is explained with reference to FIGS. 1 and 3.

Figure 3:
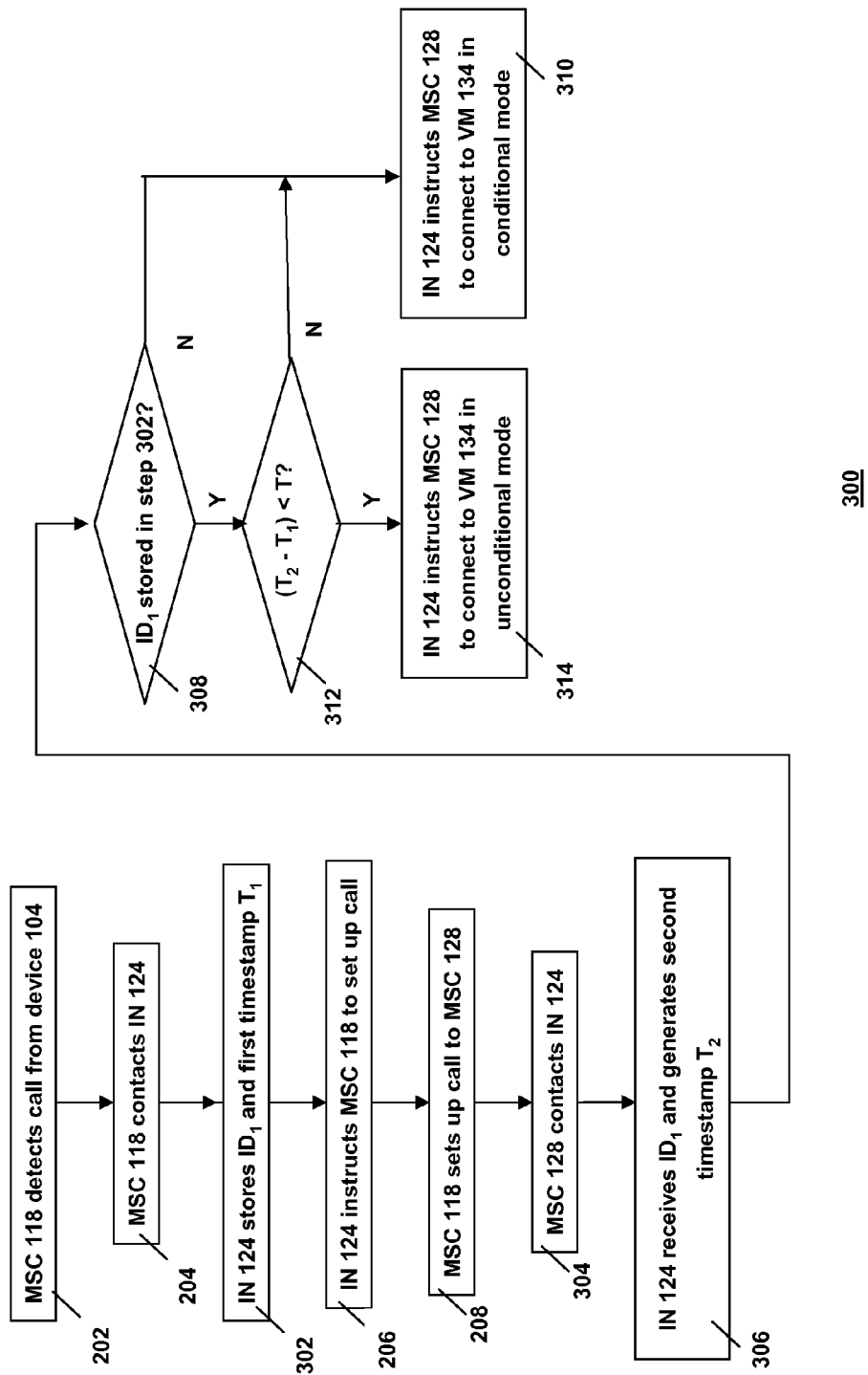
FIG. 3 is a flow diagram illustrating the method of the invention.

FIG. 3 is a flow diagram 300 illustrating the steps in a process of setting up a call to a service, here voice mail service 134, according to the invention and involving CAMEL-based networks 102 and 106. The steps that diagram 300 has in common with diagram 200 are indicated with the same reference numerals. In step 202, MSC 118 detects that device 104 is initiating a call. In step 204, MSC 118 contacts IN 124 to ask instructions about how to handle the call. In a step 302 IN 124 recognizes that a CLI-based service number has been dialed and stores the identifier (the MSISDN number in this case) of device 104 and the service number in a local memory (not shown), together with a first time stamp representative of the time $T_1$ of receipt of the identifier via the secure channel between network 102 and network 106. In step 206 IN 124 instructs MSC 118 to set up the call to the international service number, and in step 208, MSC 118 sets up the call to MSC 128. In a step 304, MSC 128 contacts IN 124 with the received identifier of device 104 (the MSISDN). MSC 128 has been programmed in advance with rules that are triggered by service numbers being dialed. In a step 306, IN 124 receives from MSC 128 the identifier of the device for which the call has been set as far as MSC 128 together with the service number used. IN 124 generates a second time stamp for a time $T_2$ at which the call has been set up as far as MSC 128. In a step 308, IN 124 determines whether the identifier was stored previously in step 302. If not, IN 124 instructs MSC 128 in a step 310 to establish the connection to voice mail server 134 in a conditional mode. That is, in order to access the voice mail at server 134 during this connection, the user of the connected device only has conditional access to voice mail server 134 upon complying with a predetermined condition, for example upon entering a password. Voice mail server 134 is thus instructed by MSC 128 to assume the conditional mode. Server 134 assumes the conditional mode on the basis of information coded by MSC 128 in the service number used to address server 134, e.g., on the basis of MSC 128 addressing server 134 with a prefix $P_1$ placed in front of the service number or of MSC 128 addressing server 134 by the long access code. On the other hand, if the identifier was stored in step 302, IN 124 determines if the difference between $T_2$ and $T_1$ is smaller than a predetermined threshold T. The value of T is typically set to a value representative of the time period needed by MSC 118 and MSC 128 to complete setting up the call. A typical value of T lies in the order of a few seconds. If the difference is not smaller than threshold T, the process proceeds to step 310 providing conditional access to service 134, as mentioned above. If the difference is smaller than threshold T, the process goes to a step 314 wherein IN 124 instructs MSC 128 to connect to server 134 in the unconditional mode, i.e., a mode wherein the caller has direct access to the service. Server 134 assumes the unconditional mode based on information coded by MSC 128 in the service number used to address server 134, e.g., based on MSC 128 addressing server 134 with a prefix $P_2$ (different from $P_1$) in front of the service number or on MSC 128 addressing server 134 by the short access code.

Note that there is never generated a first time stamp in step 302 or no recent timestamp available if the user of legitimate device 104 connects to network 102 from a communication network without a secure channel, e.g., a non-CAMEL-based network. As a result, the process will go from step 308 to step 310. Access to service 134 is given in the conditional mode, e.g., dependent on a password. If a spoofing imposter 136 connects to network 102 from a non-CAMEL-based network, access to the service is conditional. Access is then denied if imposter 136 does not know the password.

In order to accomplish above process, IN 124 is extended with an anti-CLI-spoofing component 138 that carries out the activities specified above in steps 302-314. Component 138 can be a separate piece of data processing hardware or a dedicated piece of software for being installed on the data processing system serving as IN 124, or a combination of hardware and software. Typically, if an operator already has an IN system, adding an IN-application such as anti-CLI spoofing, is merely a matter of installing a piece of software.

Note that the decision to give either conditional access or unconditional access to server 134 is made by IN 124 at the time when the connection has been set up to MSC 128. In an alternative embodiment, the decision is made by IN 124 at the time the connection to the service has been set up. In that case, server 134 itself is instructed by IN 124 to either give conditional access or unconditional access. This may require that each individual server accessed from MSC 128 sets up its own interface to IN 124 in order to process the relevant instructions. This latter option introduces some more complexity into the system. In the embodiment of the invention discussed with reference to FIGS. 1-3, the implementation is much less cumbersome and much less expensive, as merely the information, about which one of the conditional and unconditional modes to assume, is coded into the called-party number.

The invention claimed is:

1. A method of controlling access of a mobile communication device, capable of issuing a unique identifier for identifying the device, to a calling line identification (CLI)-based service on a communication network via a connection from outside the communication network, comprising:
   if the identifier is received from outside the communication network and over a secure signaling channel, storing in a memory a first time stamp, representative of a first time of receipt of the identifier;
   setting up the connection and generating a second time stamp representative of a second time at which the connection is established to the CLI-based service on the communication network;
   issuing a first instruction to establish unconditional access of the device to the CLI-based service if a time difference between the second time and first time falls within a predetermined time window threshold; and
   issuing a second instruction to grant conditional access of the device to the CLI-based service if the time difference falls outside the predetermined time window threshold.

2. The method of claim 1, wherein an intelligent network device residing within the communication network generates the first and second time stamps.

3. The method of claim 1, wherein the intelligent network device also issues the first or second instruction in accordance with the time difference.

4. The method of claim 1, wherein the CLI-based service comprises at least one of: a voice mail service, a help desk service, and a self care voice portal.

5. The method of claim 1, wherein the CLI-based service is provided via a network switch.

6. The method of claim 1, further comprising a server providing the CLI-based service.

7. The method of claim 1, wherein the time difference falls outside the predetermined time window threshold, and the conditional access is granted by requiring the entry of a password and/or PIN code to access the CLI-based service.

8. A data processing system with Service Control Point functionality and configured for controlling access of a mobile communication device, capable of issuing a unique identifier for identifying the device, to a calling line identification (CLI)-based service on a communication network via a connection from outside the communication network, the system configured to:
   if the identifier is received from outside the communication network and over a secure signaling channel, store in a memory a first time stamp, representative of a first time of receipt of the identifier;
   set up the connection and generate a second time stamp representative of a second time at which the connection is established to the CLI-based service on the communication network;
   issue a first instruction to establish unconditional access of the device to the CLI-based service if a time difference between the second time and first time falls within a predetermined time window threshold; and
   issue a second instruction to grant conditional access of the device to the CLI-based service if the time difference falls outside the predetermined time window threshold.

9. The system of claim 8, wherein the CLI-based service comprises at least one of: a voice mail service, a help desk service, and a self care voice portal.

10. The system of claim 8, wherein the CLI-based service is provided via a network switch.

11. The system of claim 8, further comprising a server providing the CLI-based service.

12. The system of claim 8, wherein the time difference falls outside the predetermined time window threshold, and the conditional access is granted by requiring the entry of a password and/or PIN code to access the CLI-based service.

13. A non-transitory computer-readable storage medium for storing instructions thereon that, if executed by a Service Control Point in a communication network, cause the Service Control Point to control access of a mobile communication device, capable of issuing a unique identifier for identifying the device, to a calling line identification (CLI)-based service on a communication network via a connection from outside the communication network, the storage medium comprising:
   first computer-readable instructions for storing in a memory a first time stamp, representative of a first time of receipt of the identifier is received from outside the communication network and over a secure signaling channel;
   second computer-readable instructions for setting up the connection and generating a second time stamp representative of a second time at which the connection is established to the CLI-based service on the communication network;
   third computer-readable instructions for issuing a first instruction to establish unconditional access of the device to the CLI-based service if a time difference between the second time and first time falls within a predetermined time window threshold; and
   fourth computer-readable instructions for issuing a second instruction to grant conditional access of the device to the CLI-based service if the time difference falls outside the predetermined time window threshold.

14. The non-transitory computer-readable storage medium of claim 13, wherein the CLI-based service comprises at least one of: a voice mail service, a help desk service, and a self care voice portal.

15. The non-transitory computer-readable storage medium of claim 13, wherein the CLI-based service is provided via a network switch.

16. The non-transitory computer-readable storage medium of claim 13, wherein the fourth computer-readable instructions include instructions for granting conditional access by requiring the entry of a password and/or PIN code to access the CLI-based service.

* * * * *